United States Patent [19]
Chung et al.

[11] Patent Number: 5,598,213
[45] Date of Patent: Jan. 28, 1997

[54] TRANSMISSION BIT-RATE CONTROLLING APPARATUS FOR HIGH EFFICIENCY CODING OF MOVING PICTURE SIGNAL

[75] Inventors: Tae-yun Chung; Gyu-hwan Jung, both of Kyungki-do, Rep. of Korea

[73] Assignee: Samsung Electronics Co., Ltd., Kyungki-do, Rep. of Korea

[21] Appl. No.: 404,064

[22] Filed: Mar. 14, 1995

[30] Foreign Application Priority Data

Mar. 15, 1994 [KR] Rep. of Korea .................. 94-5105

[51] Int. Cl.⁶ .................................................. H04N 7/36
[52] U.S. Cl. ............................................ 348/405; 348/419
[58] Field of Search ................................... 348/405, 419, 348/409, 415, 401, 420; 382/236, 238, 239, 251

[56] References Cited

U.S. PATENT DOCUMENTS

| 5,396,567 | 3/1995 | Jass | 348/405 |
| 5,404,174 | 3/1995 | Sugahara | 348/415 |
| 5,526,052 | 6/1996 | Ar | 348/405 |

*Primary Examiner*—Amelia Au
*Attorney, Agent, or Firm*—Leydig, Voit & Mayer

[57] ABSTRACT

In an encoder having a data formatter, a DCT circuit, a transmission rate controlling apparatus, a quantizer, a variable-length coder and an encoder buffer, for compressing a moving picture signal, the transmission rate controlling apparatus includes a segment complexity estimator for receiving outputs of the quantizer and variable-length coder and estimating the complexity of a segment of a current frame relative to a previous frame, a rate control adjustment coefficient calculator for receiving the output of the segment complexity estimator and calculating a rate control adjustment coefficient, a reference quantization coefficient calculator for receiving the rate control adjustment coefficient and the output of the encoder buffer and calculating a reference quantization coefficient, and an activity calculator for receiving the output of the data formatter, calculating activity by a macroblock unit, performing an operation on the calculated activity using the output of the reference quantization coefficient calculator and outputting a quantization coefficient.

5 Claims, 4 Drawing Sheets

TRANSMISSION BIT-RATE CONTROLLING APPARATUS FOR HIGH EFFICIENCY CODING OF MOVING PICTURE SIGNAL

BACKGROUND OF THE INVENTION

The present invention relates to the constant bit-rate control of a picture signal compressed by variable-length coding, and more particularly, to a transmission bit-rate controlling apparatus for the high efficiency coding of a moving picture signal, which can maintain a high picture quality by dividing the picture signal into segments and allotting a target coded bit quantity according to segment complexity.

Owing to recent remarkable developments in the fields of microprocessors, semiconductors and digital signal processors, various digital techniques for storing and transmitting a picture signal have been rapidly popularized. These techniques take into consideration the fact that when a picture signal is digitized to be stored or transmitted, the information quantity becomes considerably larger than that of the original analog signal, so that data compression becomes necessary. Basically, the data compression removes the redundancy of the picture signal for the efficient utilization of transmission channels and storage media. However, when a picture signal which has been encoded by a discrete coefficient transform (DCT) technique is compressed by variable-length coding, the thus-generated picture signal data has an irregular bit-stream. Therefore, rate control is necessary in order to maintain a constant transmission bit-rate for the processing of a digitized picture signal.

The advantage of video coding with the DCT technique is that the information of an original picture signal can be expressed efficiently with very few bits by fully coding the low-frequency portion a DCT-coded picture signal, where the energy is concentrated. In variable-length coding, a given code word is allotted variably with reference to probability concentration of the picture information, so that a code word having a variable length is transmitted. This method is suitable for the case when motion picture signals to be processed are distributed unevenly in the frequency domain. Thus, a DCT variable-length coding method is widely used as a compression method for fully expressing motion picture signals having unevenly distributed information. Here, however, since the information quantity (bits) generated per unit time should be constant when the picture information is stored or transmitted, a buffer is installed and forward or backward rate control is executed using the buffer, thereby adjusting the step size of a quantizer and adjusting generated bit quantity accordingly.

The conventional forward rate control method has an advantage in that errors due to a storage or transmission medium are propagated only within a given fixed-length unit. However, it is difficult to exactly match the generated bit quantity with target bit quantity. Without an exact match, the coding efficiency is lowered.

Also, the conventional backward rate control method has an advantage in that the generated bit quantity to be stored or transmitted is easily matched with target bit quantity since the step size of the quantizer is determined by the fullness of the buffer, by periodically checking the buffer state. However, since the quantization step size is determined irrespective of human visual characteristics, the picture quality is likely to be poor.

In order to improve the poor picture generated by the backward rate control method, there has been recently proposed a final tuning method which discriminates the local complexity of a picture through forward estimation, with reference to an updated quantization step size. The use of this method is illustrated in FIG. 1.

Referring to FIG. 1, an encoder 1 includes a data formatter 10, a DCT circuit 20, a rate controller 30, a quantizer 40 and a variable-length coder (VLC) 50. Essentially, encoder 1 compresses input picture data for output to an encoder buffer 2. Also, rate controller 30 includes a reference quantization coefficient calculator 31 for receiving a buffer fullness value $d_j$ from encoder buffer 2 and outputting a reference quantization coefficient $Q_j$, and an activity calculator 32 for receiving the output of data formatter 10, estimating current screen activity in a unit of a macroblock, performing an operation on the estimated activity using the reference quantization coefficient $Q_j$, and outputting a new quantization coefficient $Q'_j$, and maintains the output of encoder buffer 2 at a constant bit-rate.

As described above, according to the conventional rate control method, in the case of a system having a relatively low transmission bit-rate, since the reference quantization coefficient $Q_j$ does not reflect the local characteristics of a picture at all, the picture improvement effect of the forward estimation is reduced.

SUMMARY OF THE INVENTION

Therefore, in order to solve the aforementioned problems of the prior art, it is an object of the present invention to provide a rate controlling apparatus for the high efficiency coding of a motion picture signal, in which the local characteristics of a picture are considered.

To accomplish the above object, in an encoder having a data formatter, a DCT circuit, a transmission rate controlling apparatus, a quantizer, a variable-length coder and an encoder buffer, for compressing a moving picture signal, the transmission rate controlling apparatus according to the present invention comprises: a segment complexity estimator for receiving outputs of the quantizer and variable-length coder and estimating the complexity of a segment of a current frame relative to a previous frame; a rate control adjustment coefficient calculator for receiving the output of the segment complexity estimator and calculating a rate control adjustment coefficient; a reference quantization coefficient calculator for receiving the rate control adjustment coefficient and the output of the encoder buffer and calculating a reference quantization coefficient; and an activity calculator for receiving the output of the data formatter, calculating activity by a macroblock unit, performing an operation on the calculated activity using the output of the reference quantization coefficient calculator and outputting a new quantization coefficient.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, for the sake of the convenience of understanding the present invention, a general rate control method will be described.

In general, since the transmission channel width is fixed but picture data is variable-length-coded, the quantity of the generated data varies over time. Therefore, in order to adjust the generated data quantity according to a given transmission bit-rate, rate control (also called "buffer control") is necessary. To achieve this, the step size of a quantizer is mainly varied according to the buffer fullness, thereby controlling the generated data quantity.

That is, if the number of the generated bit quantity is greater than a reference value, since the quantity of data replenished in the buffer is increased, the number of bits to be generated the next time is decreased by increasing the quantization step size. On the other hand, if the number of the generated bit quantity is less than the reference value, the process is performed reversely. In this manner, the overall buffer state is adjusted to maintain a constant level. Here, however, quantization errors are generated in accordance with the quantization step size, which directly influences picture quality. Thus, rate control is essential for high picture quality, and the rate control methods vary slightly depending on the picture signal compression method employed. According to a Moving Picture Expert Group (MPEG) standard, target bit quantity is set, a virtual buffer fullness is calculated with the actually generated data and quantization step size is determined accordingly, so that target bits can be updated. In a digicipher, CCDC and DSC-HDTV, the step size which is determined depending on the actual buffer state is fed back for each coding of the slice and next slice.

In the MPEG standard, a picture is basically divided into intra (I), bi-directionally interpolative (B) and predictive (P) types, each having a differently set target bit quantity. With respect to each mode, a virtual buffer is used to calculate the target bit quantity for each slice (or segment) and the calculated quantity is updated by the difference in generated bit quantity with respect thereto, for the actual slices (or segments). The quantization step size of the slice to be coded next time is determined to be coded depending on the state of the virtual buffer. In this manner, after coding one frame, the number of target bits of the next frame is calculated considering the bit quantity generated for each frame and the picture type of the next frame, to the target bits are coded accordingly.

Meanwhile, in a method for determining the quantization step size depending on the fullness of the virtual buffer, the data generated in a slice is replenished to the buffer. Then, the quantization step size of the next slice is determined in proportion to the buffer state after the data is transmitted out through channels.

Figure 2:
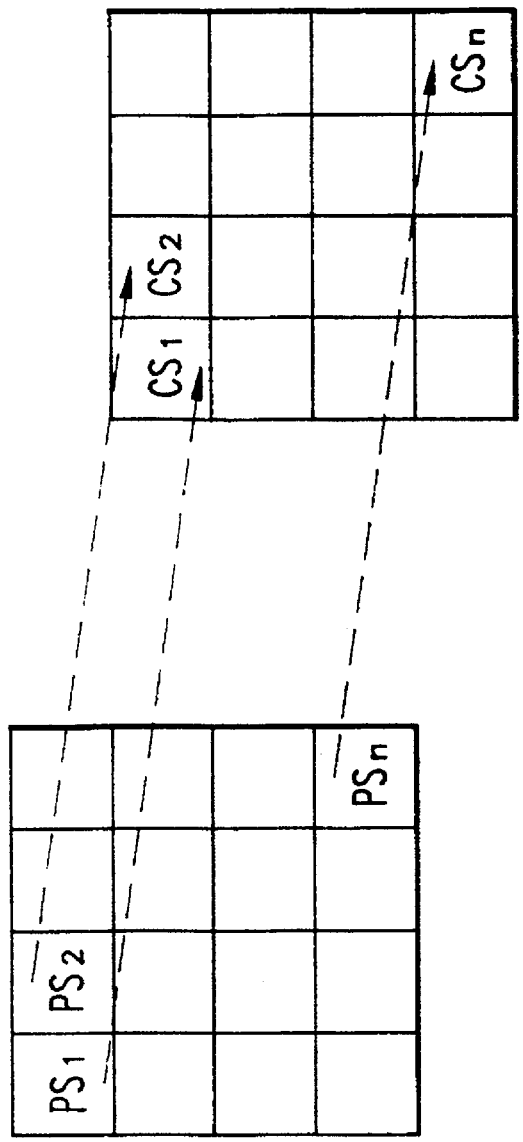
FIG. 2 shows an example of picture construction according to the present invention, wherein a current frame (right) is compared to a previous frame (left)

FIG. 2 shows examples of a picture construction for discriminating the segment complexity according to the present invention, wherein the previous frame and current frame are each divided into N segments. Here, $PS_1$, $PS_2$, ..., $PS_n$ indicate segments of the previous frame, and $CS_1$, $CS_2$, ..., $CS_n$ indicate segments of the current frame.

Referring to FIG. 2, the complexity of the respective segments ($CS_1$~$CS_n$) of the current frame is estimated based on the corresponding segment of the previous frame. That is, in the present invention, the target bit quantity set for a picture signal is not distributed conclusively depending on the buffer fullness in a quantization parameter updating unit (customarily, a macroblock), but is distributed differentially by estimating the complexity of the respective segments after dividing a picture frame into N segments. Here, the segments constructed in the present invention are larger than at least a quantization parameter updating unit, i.e., macroblock. The complexity $\alpha_n$ of the n'th segment of a current frame can be calculated by:

$$\alpha_n = \frac{NA_n}{B} \times \frac{c_n}{d} \qquad (1)$$

where $A_n$ is the generated bit quantity of the n'th segment of the previous frame, B is the generated bit quantity of all previous frames, $c_n$ is an average quantization parameter of the n'th segment of the previous frame, and d is an average quantization parameter of the previous frame. In this manner, by standardizing the total generated bit quantity of the previous frame and average value of the quantizer and standardizing the total generated bit quantity for a segment and average value of the quantizer, the complexity of the current frame can be estimated in the unit of a segment.

Also, using the complexity estimation coefficient $\alpha_n$, a rate control adjustment coefficient $K_n$ can be obtained by the following equations 2 and 3:

$$k_n = \sqrt{1 + (\alpha_n - \alpha_{avg})^2} \qquad (2)$$

for $\alpha_n - \alpha_{avg} \geq 0$ and $$k_n = \sqrt{1 - (\alpha_n - \alpha_{avg})^2} \qquad (3)$$

for $\alpha_n - \alpha_{avg} < 0$. Here, $\alpha_{avg}$ is an arithmetic mean value of the respective segment complexity estimation coefficients.

Meanwhile, a reference quantization coefficient $Q_j$ can be obtained by the following equation 4:

$$Q_j = k_n \left( \frac{31 d_j}{\gamma} \right) \qquad (4)$$

where $d_j$ is the buffer fullness reaching the j'th quantization updating unit of the current frame, $\gamma$ is buffer size, the numerical value 31 is a system constant, and $K_n$ is the rate control adjustment coefficient of the n'th segment of the previous frame. At this time, in order to minimize the buffer instability due to the adjustment coefficient, the coefficient $K_n$ is limited; that is, the adjustment coefficient is set to an upper limit critical value TH1 for $K_n > TH_1$ and is set to a lower limit critical value TH2 for $K_n < TH2$. As understood from the above equation 4, the reference quantization coefficient is determined by the buffer fullness $d_j$ conventionally, but, in the present invention, is determined by the adjustment coefficient $K_n$ in consideration of the local characteristics of a picture as well as the buffer fullness value $d_j$.

Therefore, by calculating the segment complexity of the previous frame and the corresponding rate control adjustment coefficient according to the present invention, the segment complexity of a current frame is estimated so that more target bits are allotted to a more complex segment and fewer target bits are allotted to a less complex segment, thereby dispersing the deteriorated portion of a picture evenly throughout the picture. Also, the human visual characteristics are reflected on the local picture, thereby maximizing the effect of the forward estimation so that a high-efficiency and high-picture-quality moving picture compression apparatus can be realized.

Figure 1:
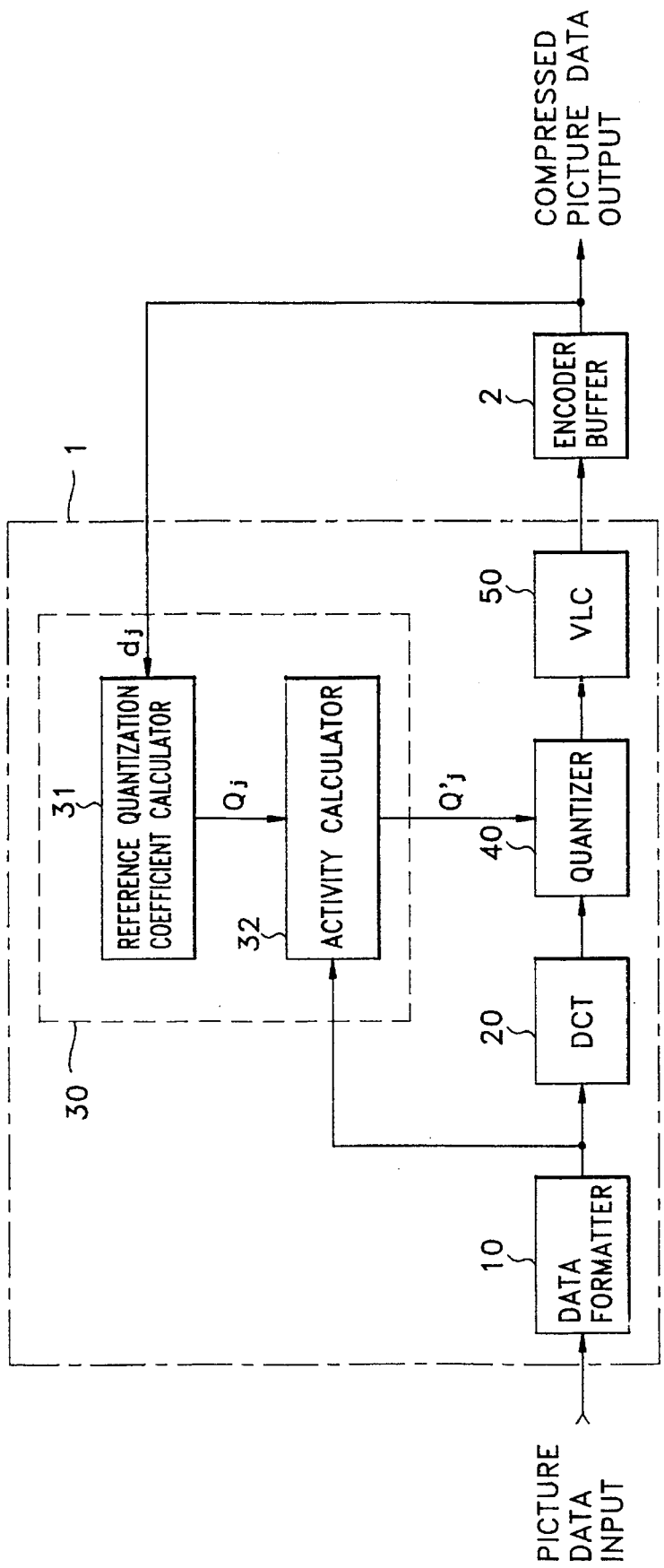
FIG. 1 is a block diagram of a moving picture encoder using a conventional rate control method.
Figure 3:
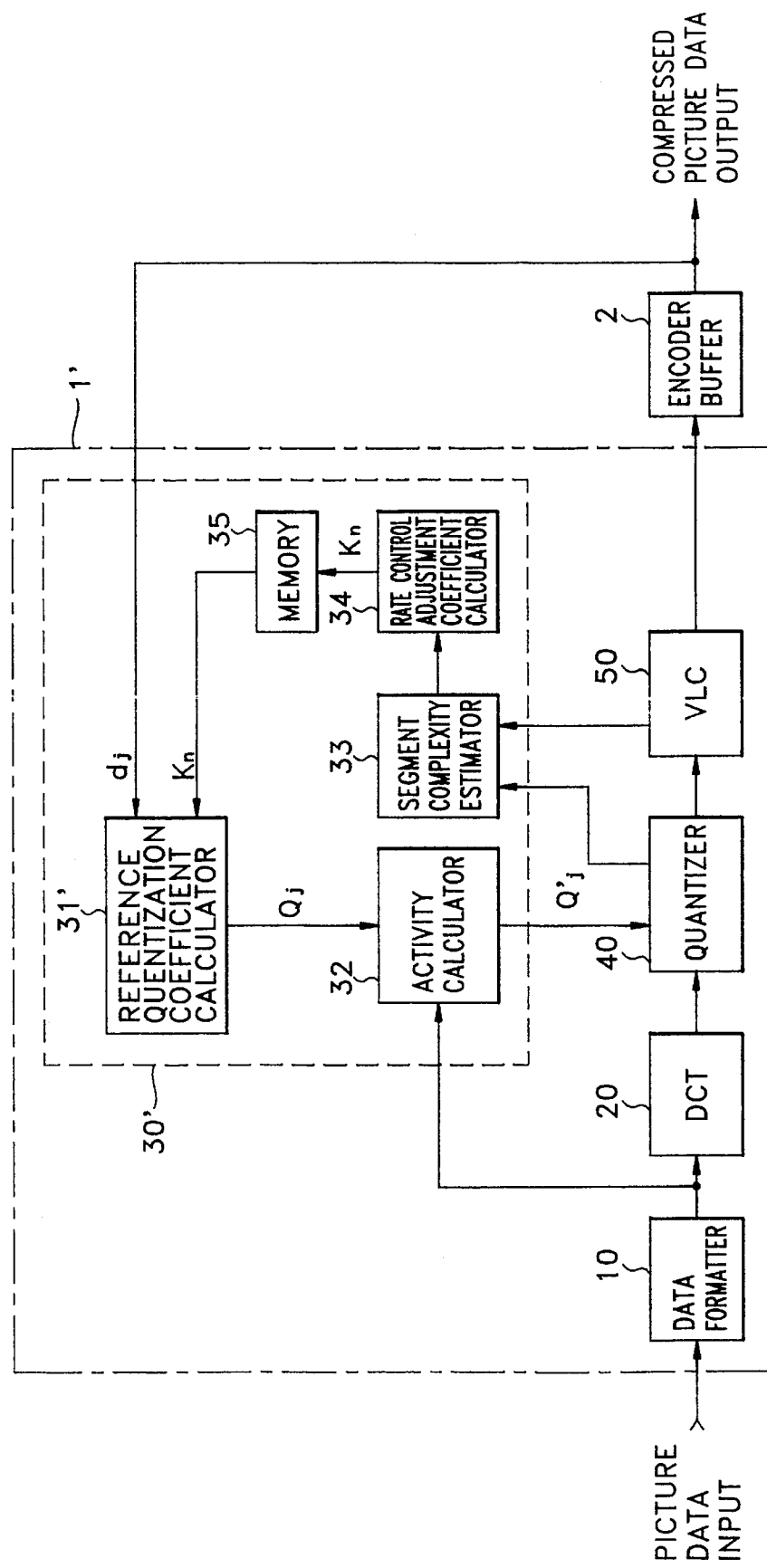
FIG. 3 is a block diagram of a moving picture signal encoder adopting the rate controlling apparatus according to the present invention.

FIG. 3 is a block diagram of the moving picture encoder adopting the transmission rate controlling apparatus according to the present invention. Here, besides the corresponding elements of FIG. 1, the moving picture encoder 1' of FIG. 3 comprises a transmission rate controlling apparatus 30' and compresses input picture data for output to encoder buffer 2. The transmission rate controlling apparatus 30' according to the present invention includes a segment complexity estimator 33 for receiving outputs of quantizer 40 and VLC 50 and estimating the segment complexity $\alpha_n$ of a current frame, a rate control adjustment coefficient calculator 34 for receiving the output of segment complexity estimator 33 and calculating a rate control adjustment coefficient $K_n$, a memory 35 for receiving and storing the output of rate control adjustment coefficient calculator 34, a reference quantization coefficient calculator 31' for receiving the output $K_n$ of rate control adjustment coefficient calculator 34 and the buffer fullness value $d_j$ from encoder buffer 2 and calculating a reference quantization coefficient $Q_j$, and an activity calculator 32 for receiving the output of data formatter 10, calculating activity by a macroblock, performing an operation on the calculated activity using the output $Q_j$ of reference quantization coefficient calculator 31' and outputting a quantization coefficient $Q'_j$.

In FIG. 3, data formatter 10 changes the picture data input (in frame units) into blocks suitable for DCT coding, e.g., 8×8 DCT blocks. DCT circuit 20 receives the output of data formatter 10 and performs DCT-coding thereon and outputs the result. Quantizer 40 receives and quantizes the output of DCT circuit 20 by varying a quantization step size according to the output $Q'_j$ of rate controlling apparatus 30'. VLC 50 receives and variable-length-codes the output of quantizer 40. Encoder buffer 2 temporarily stores the output of VLC 50. Here, the data formatter 10, DCT circuit 20, quantizer 40, VLC 50 and encoder buffer 2 constitute MPEG2 standard circuitry.

Segment complexity estimator 33 receives the outputs of quantizer 40 and VLC 50 and, according to equation 1, calculates the complexity $\alpha_n$ of the current segment. At this time, the complexity $\alpha_n$ of the current segment is obtained from the generated bits of the segments of the previous frame. Rate control adjustment coefficient calculator 34 receives the complexity $\alpha_n$ of the current segment, calculates the adjustment coefficient $K_n$ by the above equations 2 and 3, and outputs the result to memory 35.

Reference quantization coefficient calculator 31' receives the buffer fullness value $d_j$ from encoder buffer 2, receives the adjustment coefficient $K_n$ from memory 35, and calculates a reference quantization coefficient $Q_j$.

Activity calculator 32 receives the output of data formatter 10, calculates the activity of the current frame in the unit of a macroblock, multiplies the calculated activity value with the reference quantization coefficient $Q_j$ to calculate a new quantization coefficient $Q'_j$, and outputs the product to quantizer 40. Therefore, quantizer 40 adjusts the quantization step size so that the output of VLC 50 becomes close to the quantity of target bits depending on the output $Q'_j$ of activity calculator 32.

Figure 4:
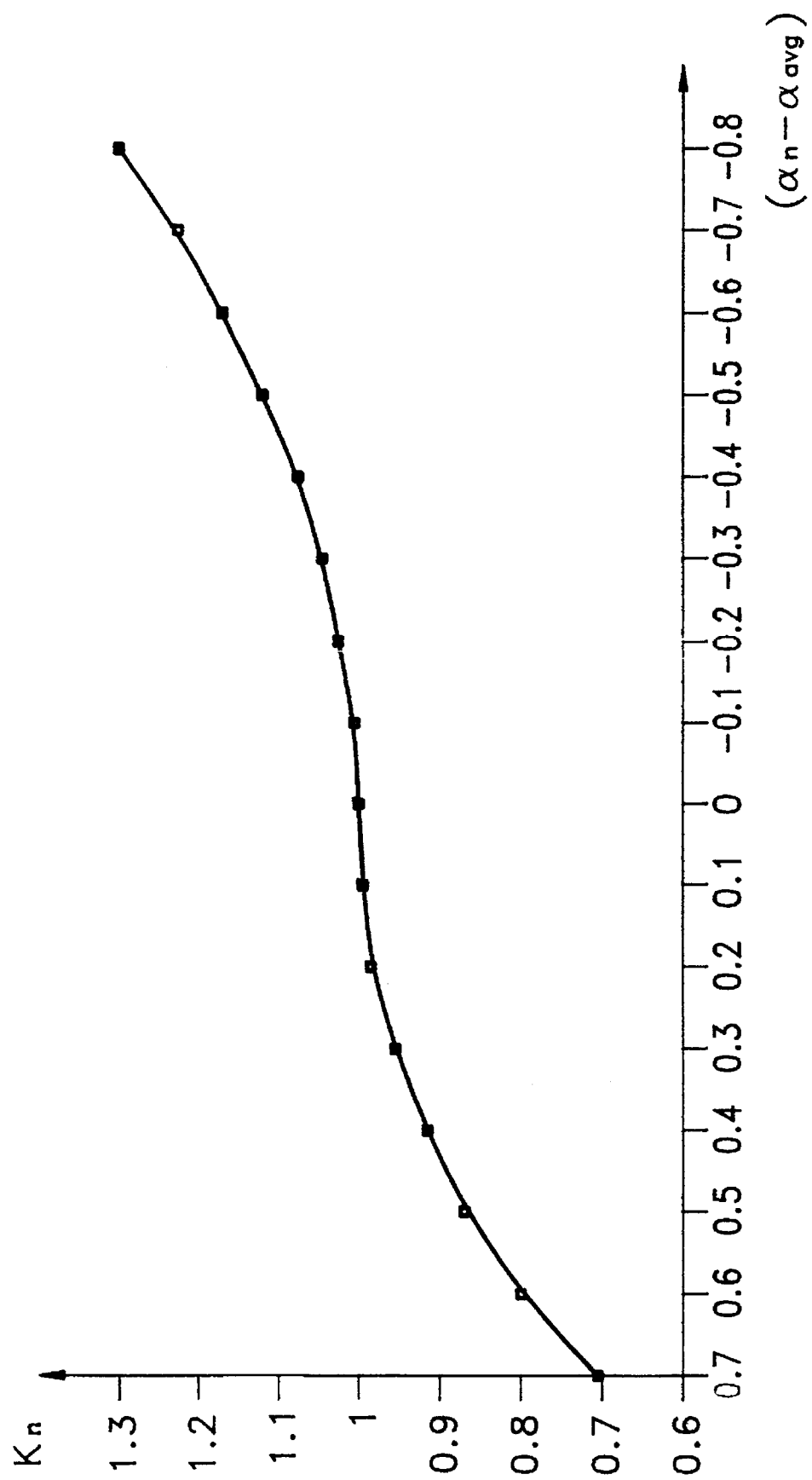
FIG. 4 is a graph showing the characteristic of an adjustment coefficient used in the rate controlling apparatus according to the present invention.

FIG. 4 is a graph showing the characteristic of an adjustment coefficient used in the apparatus according to the present invention. In FIG. 4, the abscissa indicates the difference ($\alpha_n-\alpha_{avg}$) between n'th segment complexity and average segment complexity, and the ordinate indicates a rate control adjustment coefficient $K_n$. Viewing the graph roughly, if the above complexity difference is about 0.6, the rate control adjustment coefficient $K_n$ is about 0.8. If the complexity difference is zero, the rate control adjustment coefficient $K_n$ is one. These relationships can be estimated from the above equations 2 and 3.

As described above, a moving picture data compression apparatus adopting the transmission rate controlling apparatus according to the present invention can distribute the deteriorated portion of a picture evenly throughout the picture, thereby decreasing the perceived visual distortion of the picture. Also, local complexity of a picture can be estimated. Therefore, when the local complexity is discriminated by forward estimation, a quantization parameter which is suitable for the transmission bit-rate and visual characteristics can be selected.

What is claimed is:

1. In an encoder having a data formatter, a DCT circuit, a transmission rate controlling apparatus, a quantizer, a variable-length coder and an encoder buffer, for compressing a moving picture signal, said transmission rate controlling apparatus comprising:

a segment complexity estimator for receiving outputs of said quantizer and variable-length coder and estimating the complexity of a segment of a current frame relative to a previous frame;

a rate control adjustment coefficient calculator for receiving the output of said segment complexity estimator and calculating a rate control adjustment coefficient;

a reference quantization coefficient calculator for receiving said rate control adjustment coefficient and the output of said encoder buffer and calculating a reference quantization coefficient; and an activity calculator for receiving the output of said data formatter, calculating activity by a macroblock unit, performing an operation on said calculated activity using the output of said reference quantization coefficient calculator and outputting a new quantization coefficient.

2. A transmission rate controlling apparatus as claimed in claim 1, further comprising a memory for storing the output of said rate control adjustment coefficient calculator.

3. A transmission rate controlling apparatus as claimed in claim 1, wherein said segment is constructed so as to be larger than said macroblock unit.

4. An apparatus for use in compressing an analog moving picture signal comprising:

a discrete coefficient transform (DCT) for encoding picture data and outputting encoded picture data;

a quantizer for quantifying encoded picture data using a predetermined number of quantifying bits and for outputting quantified and encoded picture data, wherein the predetermined number of quantifying bits determines a quantification step size;

a variable length coder (VLC) for encoding the quantified and encoded picture data into a variable-length coded picture signal; and a transmission rate control apparatus including a segment complexity estimator coupled to the quantizer and the variable length coder, for estimating a segment complexity of a current frame using the segment complexity of a previous frame, wherein the predetermined number of quantifying bits is variable in response to an estimate of the segment complexity of the current frame.

5. The apparatus of claim 4 comprising an encoder buffer for buffering the variable-length coded picture signal and for outputting a buffer fullness value indicative of an amount of data in the encoder buffer, wherein the transmission rate control apparatus includes a reference quantization coefficient calculator for adjusting the quantization step size responsive to the segment complexity of the current frame estimated by the segment complexity estimator and responsive to the buffer fullness value.

* * * * *